July 21, 1959    O. DAHLE    2,895,331
MAGNETIC TORQUE MEASURING DEVICE
Filed Sept. 20, 1955

Inventor
Orvar Dahle
By
Attorney

2,895,331
MAGNETIC TORQUE MEASURING DEVICE

Orvar Dahle, Vasteras, Sweden, assignor to Allmanna Svenska Elektriska Aktiebolaget, Vasteras, Sweden, a corporation of Sweden Application September 20, 1955, Serial No. 535,320

Claims priority, application Sweden September 27, 1954

3 Claims. (Cl. 73—136)

The present invention concerns a method and a device for measuring the torsional stress in cylindrical magnetic members, especially rotating shafts of iron or steel. The invention is based upon the fact that a magnetic flux generated in the surface of the cylindrical shaft is subject to a deformation, if the shaft is exposed to a torsional stress. If the shaft is of a magnetic isotropic material and surrounded by a winding fed with an alternating current, a flux is generated in the surface of the shaft which flux is parallel with the shaft, but when the shaft becomes exposed to a torsional stress, these flux lines will form an angle in relation to the generatrix of the shaft. If, therefore, a current-or voltage measuring instrument is connected to two points on the same generatrix, no current will pass the instrument as long as the shaft is not exposed to any stress, but when the shaft becomes exposed to a torsional stress, a part of the flux generated by the alternating current winding will pass the loop formed by the connections to said instrument and generate a current through the measuring instrument.

Figure 1:
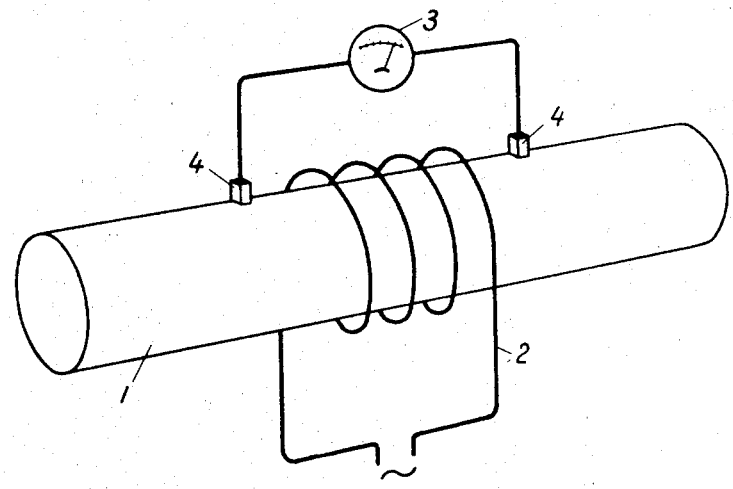
Figure 2:
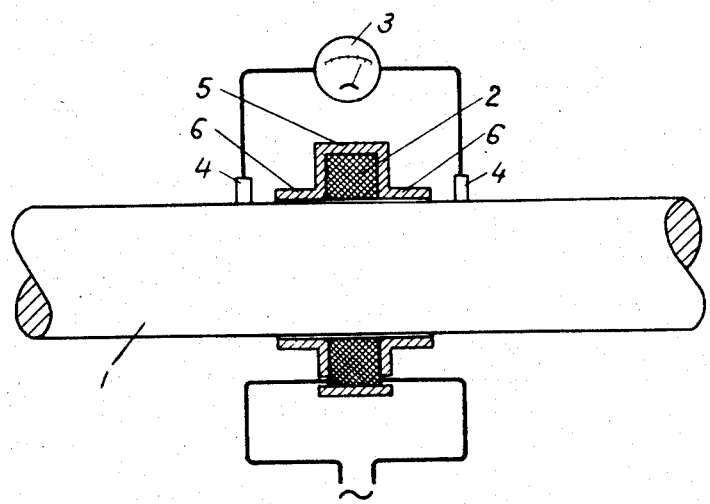

The invention will be best understood by reference to the accompanying drawing wherein Fig. 1 is a diagram partly in perspective and showing the main features of the invention and Fig. 2 is a schematic view partly in section showing a preferred form of the device.

In the drawing a shaft 1 is surrounded by a winding 2 fed by alternating current and contact brushes 4 are in sliding contact with the shaft 1 and are connected to a measuring instrument 3. As explained above, the deflection of the measuring instrument 3 depends upon the torsional stress applied to the shaft 1, but in this simple case the deflection will also be very sensitive to the brush position. This is due to the fact that it is very difficult to design a brush construction giving a reliable contact between the brushes and the shaft on the same generatrix.

In the device shown in Fig. 2, this disadvantage is entirely eliminated by arranging the brushes in contact with the shaft outside of the flux generated by the alternating current winding. This is achieved by the arrangement wherein the field generating alternating current winding is surrounded by a shell 5 of magnetic material, which prevents a dissipation of the magnetic field. Also in Fig. 2, 1 designates the shaft and 2 the alternating current winding, 3 the measuring instrument and 4 the brushes, whereas 5 designates the magnetic shell surrounding the winding 2 and provided with collar-formed pole shoes 6, which with a small play surround the shaft.

As long as the shaft is not exposed to any stress, the magnetic flux generated by the winding 2 will run axially between the pole shoes 6 in the surface layer of the shaft, but when the shaft is exposed to a torsional stress, the said flux is deformed so that the flux lines in the surface layer of the shaft will form screw lines, so that there will be a component of the flux in the surface layer of the shaft running tangentially to this shaft. There will, in other words, be an annular magnetic flux in the surface layer of the shaft. This flux will traverse the loop formed by the shaft between the brushes 4 and the conductors to the measuring instrument 3. The current induced in said loop will of course be proportional to the flux which is embraced by the loop and will thus be proportional to the torsional stress to which the shaft is exposed. As mentioned above, it is in this device of no importance, whether the brushes make contact with the shaft on the same generatrix. In reality they may be in contact with the shaft at any point, and in order to make sure of a permanent good contact, each pole of the measuring instrument may be connected with two or a plurality of parallel connected brushes. In this form it is also possible, in order to make sure of a good contact, that the brushes are in contact with slip rings attached directly to the shaft.

The invention in addition to its use for the direct measuring of the torsional stress may also be advantageously used in such cases where a regulation of the torque transmitted by the shaft is of importance. The invention is thus for instance applicable in such cases, where it is desired to distribute the load on two or a plurality of machines driven by the same motor, e.g. in driving wood pulp grind stones.

I claim as my invention:

1. Means for measuring torsional stresses in a cylindrical shaft of magnetostrictive material, which comprises a stationary coil surrounding the shaft, means for feeding alternating current into said coil whereby an axial magnetic field is generated in the shaft, a magnetic shield surrounding a part of said coil and restricting the axial extension of said magnetic field in the shaft, two contact members in contact with the shaft on opposite sides of said shielded coil, indicating means responsive to alternating voltage, and means connecting said indicating means with the said contact members.

2. Measuring means according to claim 1, wherein the said contact members consist of contact brushes with which annular surfaces on the said shaft are in sliding contact.

3. Measuring means according to claim 1, comprising slip rings attached to said shaft and making sliding contact with said contact members.

References Cited in the file of this patent
UNITED STATES PATENTS

| Number | Name | Date |
|---|---|---|
| 2,124,578 | Knerr | July 26, 1938 |
| 2,133,725 | Sperry et al. | Oct. 18, 1938 |
| 2,435,985 | Stewart et al. | Feb. 17, 1948 |
| 2,511,178 | Roters | June 13, 1950 |

OTHER REFERENCES

Magnetic Phenomena, Williams, McGraw-Hill Book Co., Inc., 1931, pages 114–121 (particularly page 121).